Dec. 2, 1941.                    S. H. HALL                    2,264,665
                    PROCESS OF CLARIFYING AND STANDARDIZING MILK
                    Filed July 7, 1938.           2 Sheets-Sheet 1

INVENTOR

Selden H. Hall
BY
Busser + Harding
ATTORNEYS.

WITNESS:
Robt R Mitchel.

Dec. 2, 1941.  S. H. HALL  2,264,665
PROCESS OF CLARIFYING AND STANDARDIZING MILK
Filed July 7, 1938  2 Sheets-Sheet 2

WITNESS:
Rob R Kitchel

INVENTOR
Selden H. Hall
BY
Burns Harding
ATTORNEYS.

Patented Dec. 2, 1941

2,264,665

UNITED STATES PATENT OFFICE 2,264,665

PROCESS OF CLARIFYING AND STANDARDIZING MILK

Selden H. Hall, Poughkeepsie, N. Y., assignor to The De Laval Separator Company, New York, N. Y., a corporation of New Jersey Application July 7, 1938, Serial No. 217,891

3 Claims. (Cl. 233—18)

My invention comprises an improved process for standardizing and clarifying milk and an efficient apparatus for carrying on that process.

Many of the larger milk companies have for some time been paying to milk producers a premium for all fat content above 3½% until the average of the milk they receive is often well above 4%. At the same time their competitors are putting them at a disadvantage by buying and paying for only milk that averages but a little above the legal 3½% fat requirement.

A very large portion of the market milk is now centrifugally clarified to remove sediment and the object of my invention is to, while clarifying the milk, remove therefrom a large proportion of the fat in excess of the 3½% legal standard.

My process may be practiced in different ways. For example, by diverting, from a major stream of whole milk flowing toward a centrifugal clarifier, a minor stream of whole milk, by separating separation into said major stream of whole milk, and by discharging the skim milk product of such separation into said major stream of whole milk, the skim milk will be, in the clarifier, thoroughly mixed with the whole milk and the mixture at the same time clarified. By properly regulating the quantity of cream removed by the separator it is possible to control the butterfat content of the clarified milk at any desired value less than that of the original whole milk.

However, I prefer to practice my process in a specially designed single centrifugal machine in which are combined the effects of the separator and the clarifier.

Figure 1:
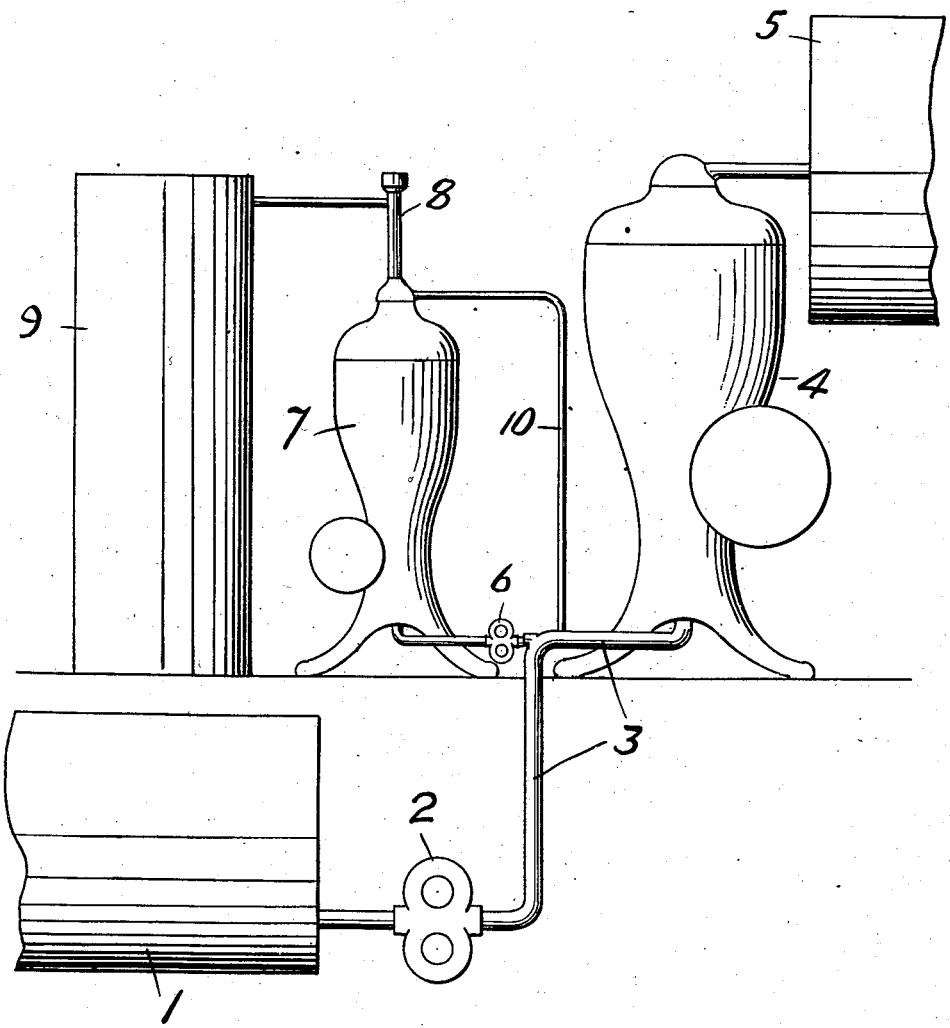
Figure 2:
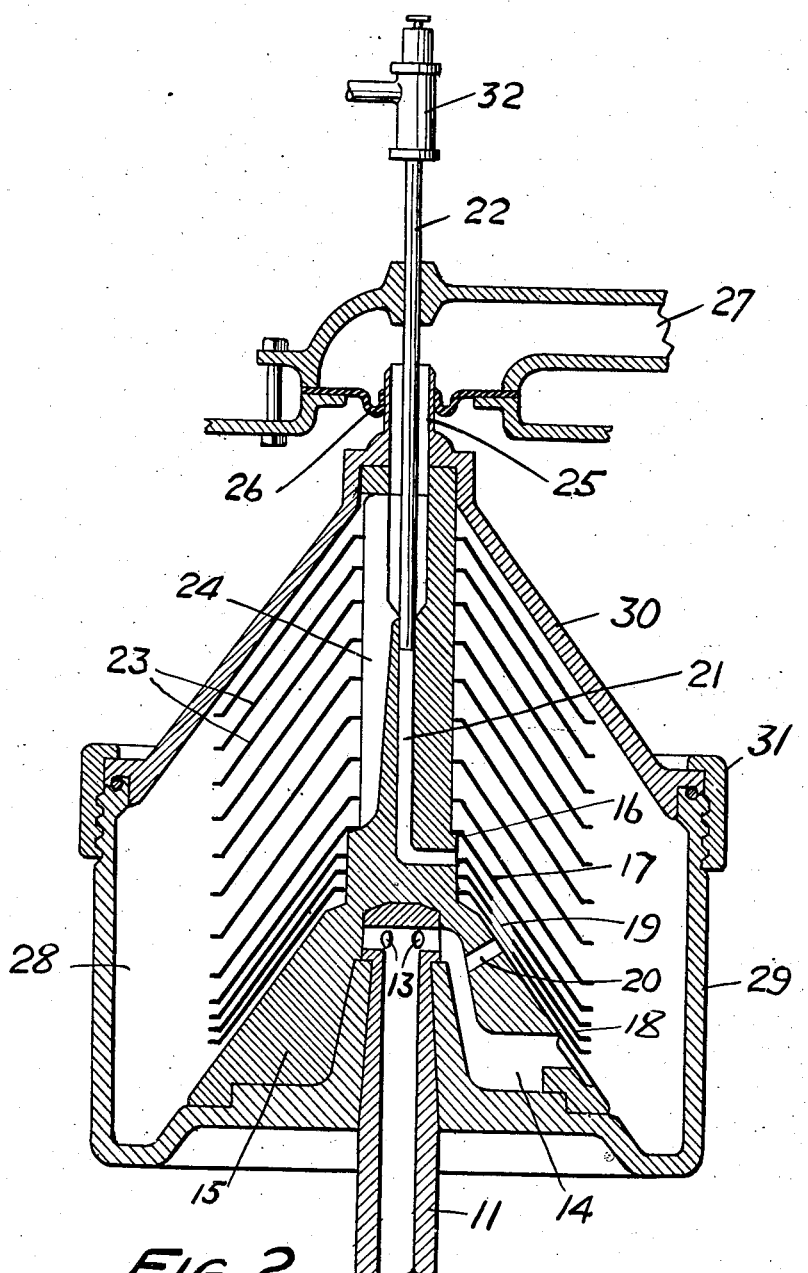

In the accompanying drawings: Fig. 1 is a diagram of an apparatus for carrying on my process by the means first described. Fig. 2 is a cross section of a single centrifugal bowl in which the entire process can be carried out.

Referring first to Fig. 1—

1 is a tank for milk to be treated, 2 is a pump, 3 a pipe leading to a clarifier 4, and 5 a tank for treated milk. 6 is a smaller pump, and 7 a separator of the type (but not necessarily of the construction) shown in Patent No. 2,002,954 with which the whole milk, skim milk and cream are all kept in a closed circuit from the time the whole milk leaves the supply tank until the skim milk and cream enter the receiving tanks. 8 is a cream control valve, 9 a cream receiving tank and 10 a skim milk pipe leading back to the pipe 3.

Referring to Fig. 2—

11 is a hollow spindle which supports and drives the bowl and through which and holes 13 whole milk enters passages 14 in the under side of the disc carrier 15. The disc carrier is provided with a shoulder 16 against which a disc 17, imperforate except for the center hole that fits around the stem of the disc carrier, fits tightly. Below the disc 17 there are a number of skimming discs 18 having distributing holes 19 with which a passage 20, branching off from the passage 14, communicates.

From the inner edges of these discs a channel 21 leads into, and upward through, the stem of the disc carrier 15 to a stationary tube 22 that continues to the outside of the machine.

Above the disc 17, there is a plurality of clarifying discs 23, only a few of which are shown, the inner edges of which communicate with grooves 24 leading to the bowl outlet tube 25, revolving inside the seal 26, and the stationary discharge tube 27, while their outer edges open to the peripheral space 28 with which the passages 14 communicate.

The bowl has the usual shell 29 and top 30 held together by a coupling ring 31.

The discharge tube 27 and associated parts are supported in the conventional manner from the machine frame (not shown).

The apparatus of Fig. 1 operates as follows. The pump 2 takes a large stream of whole milk from the tank 1 and forces it through the pipe 3 to and then through the clarifier 4 and into a receptacle 5 for treated milk. The pump 6 withdraws a small stream of milk from the pipe 3 and forces it through the separator 7 from which a quantity of cream, regulated by the control valve 8, flows to a receptacle 9, while the skim milk flows through a pipe 10 to, and again enters, the pipe 3 where it is mixed with the whole milk, and, with it, is clarified in the clarifier 4, whence it flows to the receptacle 5.

With the apparatus of Fig. 2 milk is fed through the spindle 11 and holes 13 to the passage 14 whence a minor part of it escapes through the passages 20 and the distributing holes 19 to the spaces between the discs 18 wherein the cream separates from the skim milk and escapes through the channel 21 and tube 22. The outflow of cream may be regulated by a control valve 32, which may be of the type illustrated in the Hapgood Patent No. 2,145,544, issued January 31, 1939, and can be adjusted to maintain any desired back pressure on the cream. The skim milk flows to the outer edges of the discs 18 and joins and mixes with the major portion of the whole milk as it flows out of the ends of the passages 14. The mixed milk then flows upward in the peripheral space and inward between the clarifying discs 23, where all dirt heavier than the milk is separated out, then upward through the grooves 24 and tube 25 to the discharge tube 27.

By adjusting the back pressure at the outlet of the tube 22 the quantity of cream taken out, and hence the amount of reduction of fat in the whole milk, can be controlled.

I am aware that it has been known for many years to clarify whole milk by complete separation into skim milk and cream followed by a remixing of the same, thereby producing a clarified whole milk containing the original percentage of cream. Such a process neither contemplates nor achieves the object of the invention, which is to reduce the butter fat content of whole milk to a predetermined lower percentage. It has also long been known to treat whole milk in a centrifuge containing a single outlet—that is, a clarifier—to thereby produce a clarified whole milk containing the original percentage of cream, and such process has been ever since in commercial use.

I am aware, also, that I am not the first to so treat whole milk as to reduce the butter fat content to a predetermined percentage. Subsequent to the above described processes having for their object mere clarification, a process was devised which comprised centrifugally separating whole milk into cream and skim milk and remixing with the skim milk such proportion of the cream as would enrich it to produce milk having a predetermined lower content of butter fat than the original milk. For certain uses, as, for example, if it is to be immediately condensed or made into cheese, this process is satisfactory, but if the milk is intended, as it is in most cases, for marketing as liquid milk, the product is unsatisfactory, since it is difficult to mix cream with skim milk so that the mixture will be permanent, and the "cream line," which is closely watched by the trade, is very seriously affected. The mixing of skim milk with whole milk, however, is open to no such objection. The resultant product has precisely the characteristics of the whole milk with which it is mixed, differing therefrom only in its reduced content of butterfat.

It is also well known that batch standardization of whole milk by adding cream thereto when necessary to raise the percentage of fat and by adding skim milk thereto when it is necessary to lower the percentage of fat is well known in the art, and formulae for calculating the quantities of such additions to given volumes of whole milk are well known in the art. But in the handling of dairy products, time is of primary importance, and the delay and danger of contamination incidental to batch standardization is prohibitive in any large milk plant. Advance separation and storage of skim milk would reduce the delay, but the sanitary rules in many localities would not permit such practice. In my process the usual Babcock test may be applied to the whole milk to be standardized in a few minutes, and by adjusting the controls, the continuously flowing stream of whole milk too rich in cream may be relieved of its excess cream on its way to the clarifier, from which the clarified standardized milk is delivered ready for the market.

Thus, after the first test, the operation is entirely automatic and altogether dispenses with the necessity of any subsequent batch standardization.

I do not herein claim the centrifugal machine illustrated in Fig. 2, as the same forms the subject matter of a divisional application filed May 17, 1939, Serial No. 274,205.

What I claim and desire to protect by Letters Patent is:

1. That process of standardizing and clarifying milk which comprises establishing a completely enclosed continuously flowing stream of milk from one locus to another, diverting in a closed path a fraction of the stream and removing fat from the diverted stream while maintaining the major portion of the fat in the milk with which it was originally associated, returning milk, after removal of fat therefrom, from the diverted stream in a closed path to the main stream, and at another point in the main stream clarifying the milk.

2. The process of standardizing whole milk containing an excess of butter fat to reduce its content to a predetermined percentage which comprises establishing a completely enclosed flowing stream of whole milk from one locus to another, diverting from the flowing stream of whole milk a closed branch stream containing a minor percentage of the main stream and centrifugally separating from the whole milk of the branch stream milk relatively rich in butter fat, and milk relatively poor in butter fat, flowing such separated milk relatively poor in butter fat from the locus of centrifugation through a closed stream to the main stream at a point thereof beyond cut-flow therefrom of the branch stream; and in said procedure so regulating the percentage of whole milk so centrifugally separated, the fat contents of the said separated liquids and the amount of separated milk poor in butter fat that is added to the whole milk not subjected to centrifugal separation that the said whole milk will have a butter fat content of said predetermined reduced percentage.

3. The process of standardizing and clarifying whole milk containing an excess of butter fat to reduce its content to a predetermined percentage which comprises establishing a completely enclosed flowing stream of whole milk from one locus to another, diverting at one point from the flowing stream of whole milk a closed branch stream containing a minor percentage of the main stream and centrifugally separating from the whole milk of the branch stream milk relatively rich in butter fat and milk relatively poor in butter fat, flowing such separated milk relatively poor in butter fat from the locus of centrifugation through a closed stream to the main stream at another point thereof beyond the point of outflow therefrom of the branch stream, and at still another point in the main stream clarifying the milk; and in said procedure so regulating the percentage of whole milk so centrifugally separated, the fat contents of the said separated liquids and the amount of separated milk poor in butter fat that is added to the whole milk not subjected to centrifugal separation that the said whole milk will have a butter fat content of said predetermined reduced percentage.

SELDEN H. HALL.

CERTIFICATE OF CORRECTION.

Patent No. 2,264,665.   December 2, 1941.

SELDEN H. HALL.

It is hereby certified that error appears in the printed specification of the above numbered patent requiring correction as follows: Page 1, first column, line 22, for "separation into said major" read --the cream from such minor--; line 24, for "sadi" read --said--; and that the said Letters Patent should be read with this correction therein that the same may conform to the record of the case in the Patent Office.

Signed and sealed this 13th day of February, A. D. 1945.

Leslie Frazer (Seal)   Acting Commissioner of Patents.